United States Patent [19]
Mallard et al.

[11] 3,793,519
[45] Feb. 19, 1974

[54] GAMMA CAMERA ACTIVATED TO BE RESPONSIVE TO SELECTED LEVELS OF LIGHT EMISSION

[75] Inventors: John Rowland Mallard; James Gault Mitchell, both of Aberdeen, Scotland; Robin John Wilks, Exeter, England

[73] Assignee: National Research Development Corporation, London, England

[22] Filed: Apr. 13, 1972

[21] Appl. No.: 243,663

[30] Foreign Application Priority Data
Apr. 21, 1971 Great Britain.................. 10,447/71

[52] U.S. Cl........... 250/71.5 R, 250/77, 250/83.3 R, 250/213 R
[51] Int. Cl.............................................. G01n 21/16
[58] Field of Search. 250/71.5 R, 77, 83.3 R, 213 R

[56] References Cited
UNITED STATES PATENTS

| | | | |
|---|---|---|---|
| 3,539,806 | 11/1970 | Humphrey | 250/71.5 R |
| 3,399,302 | 8/1968 | Carrell | 250/71.5 R |
| 3,462,601 | 8/1969 | Sternglass | 250/77 |

OTHER PUBLICATIONS
"Light Intensifier Device" page 945, Proceedings of 3rd Symp. on Photoelectric Imaging Devices, Sept. 20, 1965

*Primary Examiner*—Harold A. Dixon
*Attorney, Agent, or Firm*—Cushman, Darby & Cushman

[57] ABSTRACT

The invention concerns apparatus for use in investigating the distribution of radiation from an extended source of ionising rays and is particularly concerned with gamma cameras for sensing Gamma radiation. In normal Gamma cameras, due to the long exposure time, the sensitivity of the camera is reduced by spurious light emission from the scintillation screen. In the present invention the effect of this spurious emission is reduced by only triggering the image intensifier in response to predetermined values of light emission. This predetermined triggering is achieved by collecting the unwanted light emitted at the edges of the scintillation screen and directing this into one or more photomultipliers, the outputs of which are taken to a pulse height analyser which is used to trigger the image intensifier.

12 Claims, 5 Drawing Figures

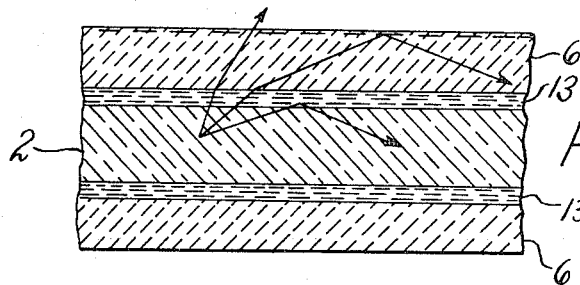
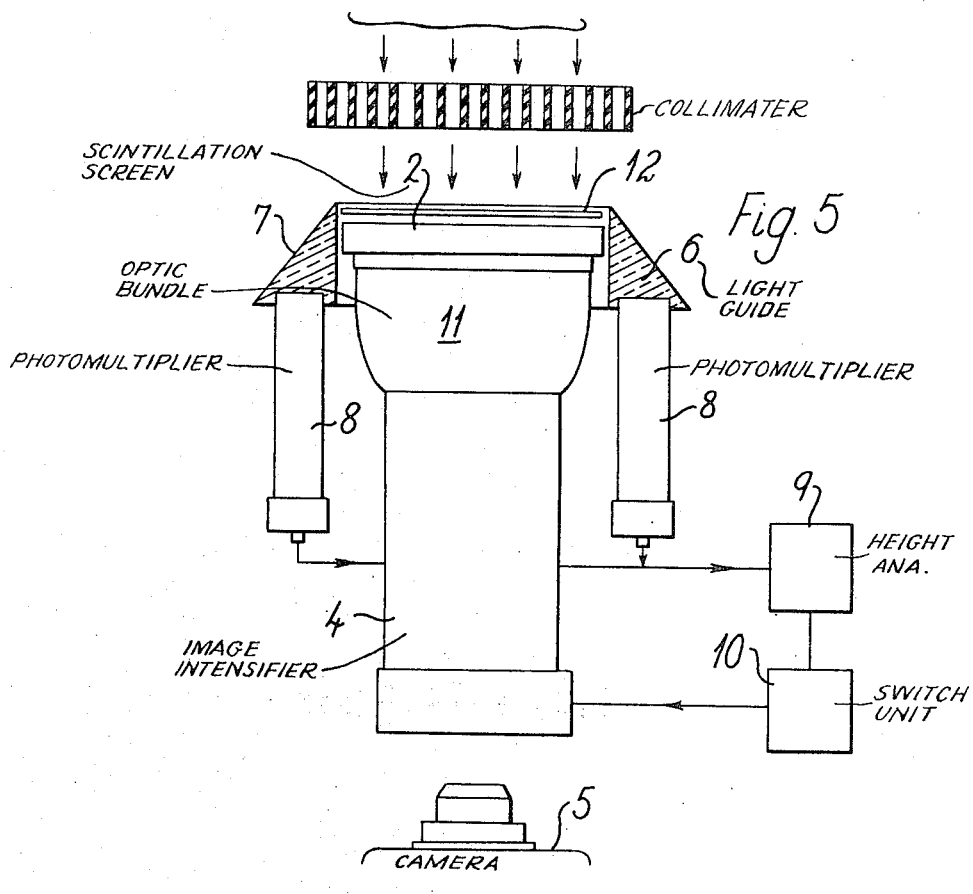
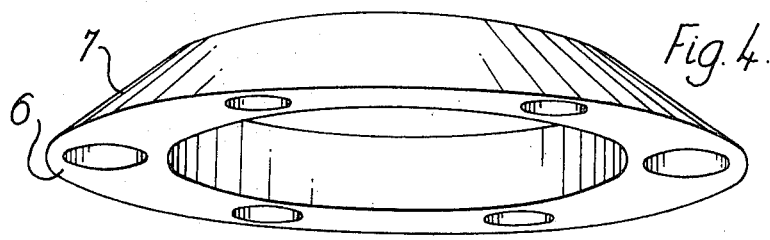

GAMMA CAMERA ACTIVATED TO BE RESPONSIVE TO SELECTED LEVELS OF LIGHT EMISSION

The present invention relates to apparatus for use in investigating the distribution of radiation from an extended soruce of ionising rays.

The invention is concerned particularly, but not exclusively, with gamma cameras, that is devices for sensing gamma radiation emitted by a source and for producing an image on the distribution of the radiation emitted by the source.

Conventionally gamma cameras comprise a collimating device for the radiation emitted by the source, a suitable screen of some material such as sodium iodide or caseium iodide which emits visible light when bombarded by radiation and upon which the collimated radiation is allowed to form, and means for investigating the optical image of the radiation distribution produced by the scintillation screen and transforming it to some form of display.

According to the present invention there is provided a device for investigating the distributing of radiation from an extended source of ionising rays, including a scintillating screen which emits visible light when bombarded by the radiation, a lens system for focussing light emitted from the main parallel faces of the scintillation screen on to an image intensifying device, means for collecting at the periphery of the scintillation screen light totally internally reflected from the main faces of the scintillation screen and for directing such collected light into at least one photomulplier, and means responsive to the output of the photomultiplier or all the photomultipliers for switching on the image intensifier so that the latter is operated only in response to a predetermined amount of radiation reaching the or each photomultiplier.

An embodiment of the present invention will now be described by way of example and with reference to the accompanying drawings, in which:

FIG. 3 is a screen illustrating the effect of total internal reflection;

FIG. 4 is a perspective view of a light guide suitable for use in the embodiment of FIG. 1; and FIG. 5 is a diagrammatic cross-section of a further embodiment.

Figure 1:
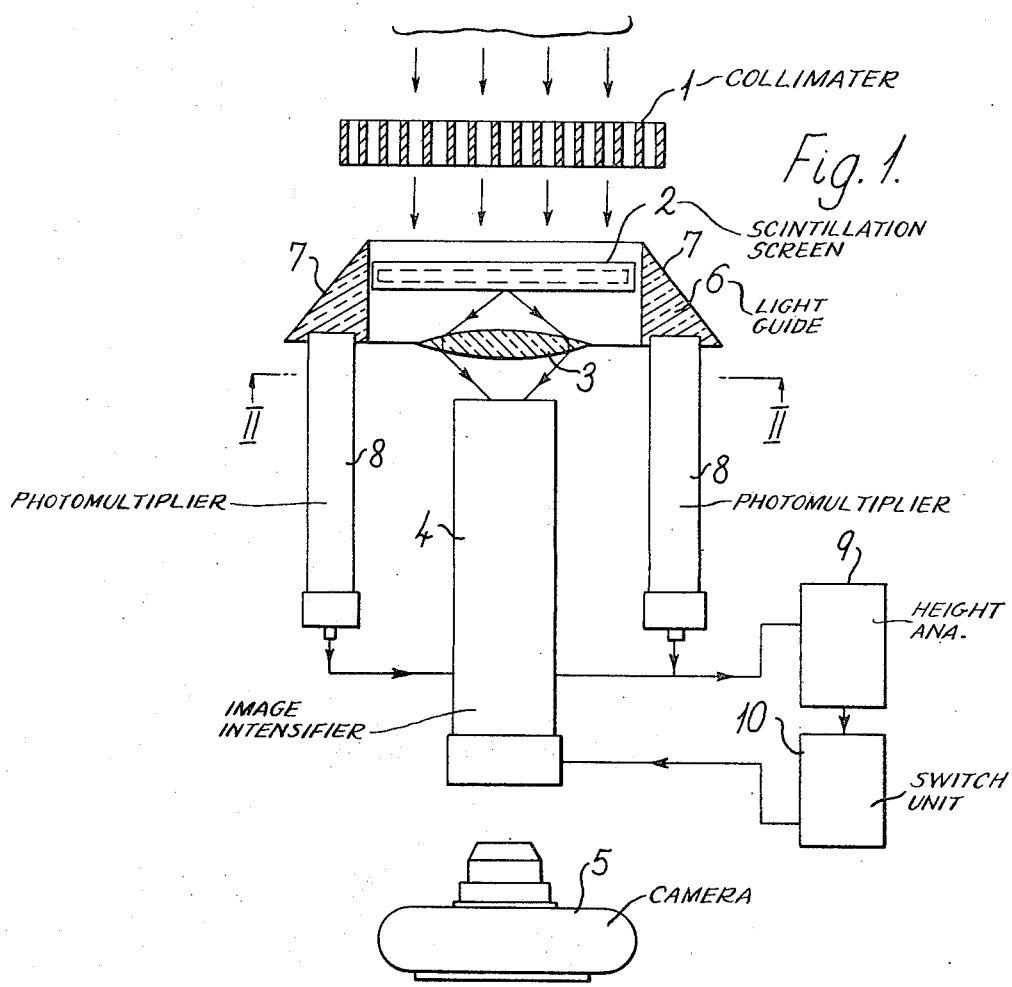
FIG. 1 is a diagrammatic cross-section through a gamma camera constructed in accordance with the present invention.
Figure 2:
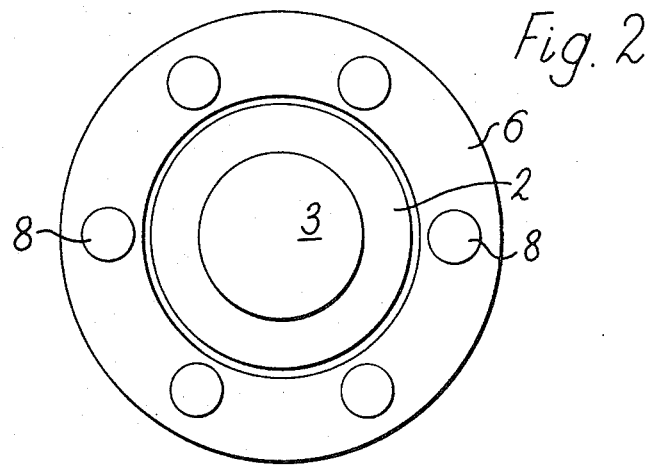
FIG. 2 is a section on line II—II of FIG. 1.

The gamma camera shown in FIG. 1 comprises a lead collimater 1 of conventional form, mounted above and parallel to caesium iodide crystal scintillation screen 2 some 20 cm. in diameter and about one-half cm. in thickness. Photon generating events occurring within the scintillation screen 2 are concentrated by a lens system 3 upon the photocathode of an image intensifier vacuum tube 4. The final image is recorded by a camera 5. Alternatively, the final image could be shown in a closed circuit television which is not shown in the accompanying drawings. Alternatively, the light could be used to actuate an array of light sensitive electronic components, e.g., photodiodes.

Spurious light emission is produced in the material of the scintillation screen 2 by such things as cosmic rays, double Compton scattering in the material of the scintillation screen 2 and the general activity of the surrounding of the gamma camera. Due to the fact that exposures of some length (5 to 300 seconds) are required, the image intensifier 4 and the material 5 act as an integrating device and these stray events reduce the sensitivity of the gamma camera by providing a background illumination of the image intensifier 4, thus reducing the signal to noise ratio.

In the present invention the signal to noise ratio is improved by operating the image intensifier 4 in pulses only in response to the occurence of desired scintillations in the screen 2. In order to achieve this use is made of the fact that a significant proportion of the light from a scintillation in the crystal either does not escape from the two parallel faces of the screen 2 but undergoes successive total internal reflections at these faces and is taken to the perimeter of the crystal or is reflected within the light guide 6 and also travels to the perimeter. These two modes by which the light reaches the perimeter are shown in FIG. 3. In order to utilise this otherwise unwanted light, the screen 2 is embedded in a light guide 6 with a high refractive index coupling fluid 13 filling the gaps between the screen 2 and light guide 6. The light guide 6 can be made from any material transparent in the wavelength region of high light output from the screen 2. If the screen 2 is made from caesium iodide this region is 3,800–4,500 A. One suitable material is lucite. The light guide 6 totally encapsultates the screen 2 thus protecting it from deformation and sealing it from the atmosphere. The light emerging from the periphery of the screen 2 is reflected by the conical face 7 of the light guide 6 and is directed to five photomutilplier tubes 8. The outputs of the photomutlipliers are summed and the total output taken to a pulse height analyser 9. It should be understood that a selected average value of the total summed signal may be analyzed as well by the pulse height analyser 9. Should the summed values of the outputs of the photomultipliers 8 be between two predetermined values the pulse height analyser triggers an E.H.T. switching unit 10 which acts to switch on the image intensifier tube 4. The level at which the pulse height analyser 9 triggers the E.H.T. switching unit 10 is selected so that the intensifier tube 4 is only operated in response to the occurrance of desired scintillations in the screen 2.

The light reaching the photomultipliers 8 is thus of two types (a) that which is trapped between the two parallel faces of the screen 2 and escapes at the perimeter and (b) that which escapes from the screen 2 into the light guide 6 but is totally internally reflected at the air light guide interface and will in general recross the crystal. In the case of (a), the amount of light trapped may be minimised by having the light guide material, and the optical coupling fluid of a high refractive index. Ideally, this should be as high as the refractive index of the crystal material of the screen 2. This will also improve the perimeter escape, in that the partial internal reflection at the perimeter will be lessened. If the perimeter of the screen 2 is hollow ground this may also help perimeter escape. The presence of the high refractive index coupling fluid also helps in minimising the adverse effect of polishing defects on the surfaces of the screen 2.

In the case of (b), the length of the recrossing path in the crystal may be minimised by making the light guide thick enough.

Finally, the light guide 6 may have its external surfaces coated with reflective material to guide the light into the cathodes of the photomultipliers 8, 8. Naturally the number of photocathodes can be varied to suit particular requirements of gamma cameras of different sizes.

In the embodiment of FIG. 5 integers similar to those in the embodiment of FIG. 1 have been given similar references. In this embodiment a conical reducing or magnifying fibre optic bundle 11 is used to couple the screen 2 directly to the photo cathode of the image intensifer 4 instead of the lens system, to provide improved light collection. To retain resolution would require fibre optics of very small acceptance angle if crystals of normal thickness are used for the screen 2. However, it is not necessary for the whole fibre optic bundle 11 to have this small acceptance angle. Thus, a very thin plate 12 of small acceptance angle material is inserted between the screen 2 and the main bundle 11.

Further, the output window of the image intensifer 4 may also be made of fibre optics, in this way film may be pressed directly against the face-plate, allowing a light intensity improvement of the color of 100.

It would also be possible to couple a suitable television camera tube directly to the output plate by means of a fibre optic coupling, with or without the possiblity of an image size change.

A further feature in the embodiment of FIG. 5 is a piece of lead glass 13 surrounding the crystal on the side away from the incoming rays. This has the advantage of providing an efficient shield for unwanted gamma-rays and also greatly diminishes the back-scattered gamma-rays. These would normally be produced if the light guide 6, the crystal encapsulation, or any other material in the vicinity of the crystal, is of low atomic number. This arrangement is particularly advantageous for multiple isotope studies, e.g., $^{198}$Au, and $^{75}$Se because the back-scattered energy of the $^{198}$Au interferes seriously with the wanted energy of the $^{75}$Se.

In a simplified form of the embodiment of FIG. 5 which is not shown a fibre optic plate is used to optically couple the image intensifier 4 to the lens system 3. One surface of this fibre optic plate will be optically coupled to the image intensifier and its other surface is figured to correspond to the image plane of the lens system 3 and will be positioned in that image plane.

In getting the light to the photomultiplier tubes, the geometry of that part of the light guide on which the P.M. tubes are mounted may be so arranged as to get the minimum of light reflected, or diffused, back to the crystal, and the maximum amount into the photomultiplier tube cathodes. This may be done by using photomultiplier tubes whose cathodes extend up the cylindrical portion of the tube, thereby allowing these cathodes to be immersed in the light guide. This part of the light guide may also be shaped and coated with reflective material to guide the light into the cathodes (see FIG. 4) for typical examples.

We claim:

1. A device for investigating the distribution of radiation from an extended source of ionising rays, including a scintillation screen which emits visible light when bombarded by the radiation, a lens system for focusing light emitted from the main parallel faces of the scintillation screen on to an image intensifying device, means for collecting at the periphery of the scintillation screen light totally internally reflected from the main faces of the scintillation screen and for directing such collected light into at least one photomultiplier, and means responsive to the output of the photomultiplier for switching the image intensifier on so that the latter is operated only in response to a predetermined amount of radiation reaching the photomultiplier.

2. A device as claimed in claim 1 wherein the means for collecting the light comprises a translucent body surrounding the periphery of the scintillation screen.

3. A device as claimed in claim 2 wherein the translucent body has a frustoconical surface including a plurality of said photomultiplier devices, at which light collected from the scintillation screen is totally internally reflected to each of the photomultipliers.

4. A device as claimed in claim 3 in which a high refractive index coupling fluid is interposed in the gaps between the scintillation screen and the translucent body.

5. A device as claimed in claim 4 in which the or each photomultiplier has at least its cathode partially embedded in said translucent body.

6. A gamma camera for investigating distribution of gamma radiation from an extended source comprising a collimator mounted parallel to a crystal scintillation screen, a lens system for focusing light emitted from the scintillation screen on to an image intensifying device, a translucent body surrounding the scintillation screen so as to collect at the periphery of the scintillation screen light totally internally reflected from the main faces of the scintillation screen, said translucent body having a frustoconical surface including at least one photomultiplier device disposed therein, for totally internally reflecting the collected light into said photomultiplier, and means responsive to the output of the photomultiplier for switching the image intensifier on so that the latter is operated only in response to a predetermined amount of radiation reaching the photomultiplier.

7. A gamma camera as claimed in Claim 6 and including a plurality of said photomultiplier devices, means for summing the outputs of the photomultipliers, a pulse height analyser for analysing the height of the summed output of the photomultipliers, and switching means triggered by the pulse height analyser for switching the image intensifier on whenever the summed output of the photomultipliers exceeds a predetermined value.

8. A gamma camera as claimed in claim 7 and including a plate of lead glass parallel to the scintillation crystal and located on the side of the scintillation crystal remote from the incoming gamma rays.

9. A gamma camera as claimed in claim 8 and including a fibre optic system for coupling the lens system to said image intensifier.

10. A gamma camera as claimed in claim 9 wherein at least the cathodes of the photomultipliers are embedded in the translucent body.

11. A gamma camera as claimed in claim 7 wherein the summed output is a total of all the phtomultiplier outputs.

12. A gamma camera as claimed in claim 7 wherein the pulse height analyser produces an output when the summed output of the photomultiplier exceeds a selected average value.

* * * * *